(12) United States Patent
Schwarte et al.

(10) Patent No.: US 7,261,926 B2
(45) Date of Patent: *Aug. 28, 2007

(54) SOLVENTBORNE COATING SUBSTANCE THAT CAN BE CURED PHYSICALLY, THERMALLY OR THERMALLY AND BY USING ACTINIC RADIATION AND USE THEREOF

(75) Inventors: Stephan Schwarte, Emsdetten (DE); Willi Vesper, Wiesentheid (DE); Egon Wegner, Veitshöchheim (DE); Kerstin Ziegler, Moenchstockheim (DE)

(73) Assignee: BASF Coatings AG, Munster (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/476,814

(22) PCT Filed: Jun. 18, 2002

(86) PCT No.: PCT/EP02/06702

§ 371 (c)(1),
(2), (4) Date: Nov. 3, 2003

(87) PCT Pub. No.: WO03/000807

PCT Pub. Date: Jan. 3, 2003

(65) Prior Publication Data

US 2004/0143033 A1  Jul. 22, 2004

(30) Foreign Application Priority Data

Jun. 21, 2001  (DE) .............................. 101 29 899

(51) Int. Cl.
*C08K 7/18* (2006.01)
*B05D 3/06* (2006.01)

(52) U.S. Cl. ............ 427/553; 523/220; 523/223; 524/417; 524/442; 524/445; 524/456; 524/492; 524/493; 524/494; 427/402; 427/372.2

(58) Field of Classification Search ............. 524/445, 524/417, 493, 494, 791, 847; 523/220, 221, 523/223; 427/553, 402, 372.2

See application file for complete search history.

(56) References Cited

U.S. PATENT DOCUMENTS

| | | | | |
|---|---|---|---|---|
| 3,361,844 A | 1/1968 | Hoeschele | ............... | 260/858 |
| 3,714,107 A | 1/1973 | Smith | ................... | 523/220 |
| 4,171,228 A * | 10/1979 | Lowrey | ................. | 106/409 |
| 4,220,679 A | 9/1980 | Backhouse | ............ | 427/401 |
| 4,268,542 A | 5/1981 | Sakakibara et al. | ...... | 427/195 |
| 4,366,185 A * | 12/1982 | Tanaka et al. | ........... | 427/386 |
| 4,403,003 A | 9/1983 | Backhouse | | |
| 4,489,135 A | 12/1984 | Drexler et al. | .......... | 428/423.1 |
| 4,652,470 A | 3/1987 | Das et al. | ............. | 427/407.1 |
| 4,675,234 A | 6/1987 | Sachs et al. | ............. | 428/328 |
| 4,680,204 A | 7/1987 | Das et al. | ............. | 427/407.1 |
| 5,028,639 A | 7/1991 | Treutlein et al. | ........... | 523/200 |
| 5,210,154 A | 5/1993 | Weidemeier et al. | ....... | 525/438 |
| 5,334,420 A | 8/1994 | Hartung et al. | .......... | 427/407.1 |
| 5,356,669 A | 10/1994 | Rehfuss et al. | .......... | 427/407.1 |
| 5,425,970 A | 6/1995 | Lahrmann et al. | .......... | 427/493 |
| 5,516,559 A | 5/1996 | Röckrath et al. | ........ | 427/407.1 |
| 5,574,103 A | 11/1996 | Wu et al. | ................. | 525/127 |
| 5,589,228 A | 12/1996 | Wegner et al. | | |
| 5,601,878 A | 2/1997 | Kranig et al. | ............. | 427/386 |
| 5,601,880 A | 2/1997 | Schwarte et al. | | |
| 5,686,531 A | 11/1997 | Engelke et al. | | |
| 5,691,425 A | 11/1997 | Klein et al. | ............. | 525/455 |
| 5,707,941 A | 1/1998 | Haberle | ................. | 528/44 |
| 5,716,678 A | 2/1998 | Röckrath et al. | | |
| 5,863,321 A * | 1/1999 | Crumley et al. | ........... | 106/404 |
| 5,965,213 A | 10/1999 | Sacharski et al. | .......... | 427/475 |
| 6,001,424 A | 12/1999 | Lettmann et al. | ........ | 427/407.1 |
| 6,001,915 A | 12/1999 | Schwarte et al. | .......... | 524/457 |
| 6,159,556 A | 12/2000 | Möller et al. | | |
| 6,162,506 A | 12/2000 | Lettmann et al. | ........ | 427/407.1 |
| 6,242,056 B1 * | 6/2001 | Spencer et al. | ............. | 427/512 |
| 6,344,501 B1 | 2/2002 | Sierakowski et al. | | |
| 6,403,699 B1 | 6/2002 | Röckrath et al. | | |
| 6,555,612 B1 | 4/2003 | Mayer et al. | | |

(Continued)

FOREIGN PATENT DOCUMENTS

| | | |
|---|---|---|
| CA | 2102169 | 5/1994 |
| CA | 2079498 | 2/2002 |
| EP | 113 435 | 7/1984 |
| EP | 249 201 | 6/1987 |
| EP | 276 501 | 9/1987 |
| EP | 354 261 | 8/1988 |
| EP | 424 705 | 10/1990 |
| EP | 522 420 | 6/1992 |
| EP | 594 068 | 10/1993 |
| EP | 594 071 | 10/1993 |
| EP | 594 142 | 10/1993 |

(Continued)

OTHER PUBLICATIONS

Lida, David R. CRC Handbook of Chemistry and Physics [online]. 2004 [ retrieved on Jun. 18, 2004]. p. 4-48, 4-49, 4-67. Retrieved from the Internet: <URL: http://www.hbcpnetbase.com/home.asp>.*

(Continued)

*Primary Examiner*—Vasu Jagannathan
*Assistant Examiner*—Vickey Ronesi

(57) ABSTRACT

A solventborne coating material curable physically, thermally, or thermally and with actinic radiation, comprising
A) at least one binder curable physically, thermally, or thermally and with actinic radiation,
B) at least one color and/or effect pigment, and
C) at least one colorless, transparent or opaque powder which is substantially inert with respect to the other constituents of the coating material and whose particles have an average size of from 1.0 to 10.0 μm and a density of from 1.25 to 3.6 g cm$^{-3}$
and its use as basecoat material for producing multicoat color and/or effect paint systems.

11 Claims, No Drawings

U.S. PATENT DOCUMENTS

| | | |
|---|---|---|
| 6,607,788 B1 | 8/2003 | Wegner et al. |
| 2003/0139512 A1 | 7/2003 | Wegner et al. .............. 524/445 |

FOREIGN PATENT DOCUMENTS

| | | |
|---|---|---|
| EP | 702 055 | 3/1996 |
| FR | 2746809 | 4/1996 |
| GB | 1127338 | 6/1967 |
| GB | 1220717 | 9/1968 |
| JP | 03075137 A * | 3/1991 |
| WO | WO93/17060 | 9/1993 |
| WO | WO94/10211 | 5/1994 |
| WO | WO94/10212 | 5/1994 |
| WO | WO94/10213 | 5/1994 |
| WO | WO96/12754 | 5/1996 |
| WO | WO97/12945 | 4/1997 |
| WO | WO97/49745 | 12/1997 |
| WO | WO97/49747 | 12/1997 |
| WO | WO0157142 | 8/2001 |

OTHER PUBLICATIONS

Lewis Sr., Richard J.; Hawley's Condensed Chemical Dictionary, John Wiley and Sons, New York 1997 (p. 227, 907, 909).*
Wypych, George. Handbook of Fillers, 2nd Edition. Toronto, Plastics Design Library, 2000, pp. 75, 87, 242. TP1114.W96.*
Hawley's Condensed Chemical Dictionary, 14th Edition, 2002.*
English Abstract for FR2746809 from EPO, Oct. 3, 1997.
Machine Translation of JP08231904 from JPO, Sep. 10, 1996.
English Abstract for JP08231904 from EPO, Oct. 9, 1996.
English Language Abstract for DE19645761 from EPO, May 7, 1998.
English Language Abstract for DE19741554 from EPO, Jun. 10, 1999.
Szycher, Michael. Szycher's Handbook of Polyurethanes. F.L., CRC Press, 1999, p. 14-1-14-2. TP1180.P8S98.

* cited by examiner

SOLVENTBORNE COATING SUBSTANCE THAT CAN BE CURED PHYSICALLY, THERMALLY OR THERMALLY AND BY USING ACTINIC RADIATION AND USE THEREOF

CROSS REFERENCE TO RELATED APPLICATIONS

This application is a National Phase Application of Patent Application PCT/EP02/06702 filed on 18 Jun. 2002, which claims priority to DE 101 29 899.4, filed on 21 Jun. 2001.

The present invention relates to a novel solventborne coating material and to its use for producing single-coat and multicoat color and/or effect paint systems in automotive OEM finishing and automotive refinish, in industrial coating, including coil coating and container coating, in the coating of plastics, and in furniture coating.

Solventborne coating materials curable physically, thermally, or thermally and with actinic radiation have been known for a long time. These known solventborne coating materials, especially the basecoat materials, and the single-coat or multicoat color and/or effect paint systems produced with them possess very good performance properties.

Where the single-coat or multicoat color and effect paint systems produced from the known solventborne coating materials comprise effect pigments, especially metallic pigments, there may be formation of what are known as clouds, i.e., areas of light/dark shading. These are an indicator of deficiencies in dispersing and/or orienting the color and/or effect pigments, especially the effect pigments, in the finish. However, it is precisely in the case of particularly high-value products having extensive finishes, such as automobiles, for example, that cloudy finishes are fundamentally unacceptable, since paint defects of this kind suggest low quality in the entire product (e.g., the automobile).

Clouding occurs in particular in color and effect paint systems which have bright metallic shades. The clouding is dependent on the coat thickness and wetness, and therefore occurs to an increased extent in the overlap zones of the paint jets produced by the atomizers.

Moreover, when the known solventborne coating materials are used for refinish, unacceptable differences in shade arise between the original finish and the refinish when one and the same basecoat material is used. The reason for these unwanted shade differences arising is primarily that the original basecoat is applied by electrostatic spraying, or by electrostatic spraying and pneumatically, whereas the refinish is applied pneumatically alone.

The American patent U.S. Pat. No. 4,652,470 A discloses a wet-on-wet technique for producing multicoat color and/or effect paint systems, in which the solventborne basecoat material comprises insoluble polymer microparticles having a diameter of from 0.01 to 40 µm. In order to prevent strike-in of the clearcoat into the basecoat, the clearcoat materials must comprise inorganic microparticles with a size of from 1 to 150 nm.

The German patent application DE 100 04 494.8, unpublished at the priority date of the present specification, describes an aqueous coating material curable physically or thermally and/or with actinic radiation and comprising A) at least one ionically and/or nonionically stabilized polyurethane which is saturated, unsaturated and/or grafted with olefinically unsaturated compounds, as binder, B) at least one color and/or effect pigment, and C) at least one colorless, transparent or opaque powder which is substantially inert with respect to the other constituents of the coating material and whose particles have an average size of from 1.0 to 10.0 µm and a density of from 0.8 to 3.6 g cm$^{-3}$.

The aqueous coating material produces aqueous basecoats in which clouding is minimal.

It is an object of the present invention to provide a novel solventborne coating material which is curable physically, thermally, or thermally and with actinic radiation and which is very highly suitable as a basecoat at material or solid-color topcoat material for producing single-coat and multicoat color and effect paint systems which exhibit markedly reduced clouding.

The color and effect paint systems produced using the novel solventborne coating materials should have improved shade stability in response to changes in coat thickness and/or wetness. Moreover, the shade of original finishes and refinishes should match when one and the same solventborne basecoat material is used.

The invention accordingly provides the novel solventborne coating material curable physically, thermally, or thermally and with actinic radiation, which comprises A) at least one binder curable physically, thermally, or thermally and with actinic radiation, B) at least one color and/or effect pigment, and C) at least one colorless, transparent or opaque powder which is substantially inert with respect to the other constituents of the coating material and whose particles have an average size of from 1.0 to 10.0 µm and a density of from 1.25 to 3.6 g cm$^{-3}$ and is referred to below as the "coating material of the invention".

Further subject matter of the invention will emerge from the following description.

In the light of the prior art it was surprising and unforeseeable for the skilled worker that the object on which the present invention is based could be achieved by means of the specially selected powder (C) for use in accordance with the invention. Indeed, the expectation was more that the use of powders (C) whose average particle size lies within the order of magnitude of the dry film thickness of the basecoats or solid-color topcoats produced from the coating materials of the invention would be accompanied by serious disadvantages, especially with regard to the quality of the overall appearance and the level of intercoat adhesion. Moreover, it was surprising that there was no shade difference, or only a very low, acceptable shade difference, when a basecoat produced from the coating material of the invention was refinished with one and the same coating material of the invention.

The coating material of the invention may be physically curing.

In the context of the present invention, the term "physical curing" denotes the curing of a layer of a coating material by filming through loss of solvent from the coating material, with linking within the coating taking place via looping of the polymer molecules of the binders (regarding the term, cf. Römpp Lexikon Lacke und Druckfarben, Georg Thieme Verlag, Stuttgart, New York, 1998, "binders", pages 73 and 74). Or else filming takes place by way of the coalescence of binder particles (cf. Römpp Lexikon Lacke und Druckfarben, Georg Thieme Verlag, Stuttgart, New York, 1998, "curing", pages 274 and 275). Normally, no crosslinking agents are required for this purpose. Where appropriate physical curing may be assisted by atmospheric oxygen, by heat or by exposure to actinic radiation.

The coating material of the invention may be thermally curable. In this context it may be self-crosslinking or externally crosslinking.

In the context of the present invention, the term "self-crosslinking" refers to the capacity of a binder to enter into crosslinking reactions with itself. A prerequisite for this is that the binders already contain both kinds of complementary reactive functional groups which are necessary for crosslinking, or else the binder contains reactive functional groups which are able to react "with themselves". Externally crosslinking coating materials, adhesives and sealing compounds, on the other hand, are those in which one kind of the complementary reactive functional groups is present in the binder and the other kind is present in a curing or crosslinking agent. For further details, refer to Römpp Lexikon Lacke und Druckfarben, Georg Thieme Verlag, Stuttgart, New York, 1998, "curing", pages 274 to 276, especially page 275, bottom.

The coating material of the invention may be curable thermally and with actinic radiation. Where thermal curing and curing with actinic radiation are employed together in the context of one coating material, the terms "dual cure" and "dual-cure coating material" are also used.

In the context of the present invention, actinic radiation means electromagnetic radiation, such as near infrared (NIR), visible light, UV radiation or X-rays, especially UV radiation, and corpuscular radiation, such as electron beams.

The coating material of the invention may be a one-component (1K) system.

In the context of the present invention a one-component (1K) system is a coating material curable thermally or thermally and with actinic radiation in which the binder and the crosslinking agent are present alongside one another, i.e., in one component. A prerequisite for this is that the two constituents crosslink with one another only at relatively high temperatures and/or on exposure to actinic radiation.

The coating material of the invention may also be a two-component (2K) or multicomponent (3K, 4K) system.

In the context of the present invention, this means a coating material in which in particular the binder and the crosslinking agent are present separately from one another in at least two components which are not combined until shortly before application. This form is chosen when binder and crosslinking agent react with one another even at room temperature. Coating materials of this kind are employed in particular for coating thermally sensitive substrates, especially in automotive refinish.

The coating material of the invention is solventborne. This means that its constituents are present in dispersion and/or solution in at least one organic solvent.

The essential constituent of the coating material of the invention is the powder (C). This powder (C) is a powder of uniform composition, i.e., its particles materially have the same composition. Or else it is a mixture of at least two powders (C). The decision as to which variant is given preference is guided by the requirements which are imposed on the coating material of the invention in the case in hand. In the great majority of cases, the use of one powder (C) is sufficient to achieve the advantages according to the invention.

The powder (C) for use in accordance with the invention is colorless. This means that it has no hue and no chroma but only lightness. Accordingly, it is white or has a gray shade. Preferably, however, it is white. For further details, refer to Römpp Lexikon Lacke und Druckfarben, Georg Thieme Verlag, Stuttgart, New York, 1998, "achromatic point", page 590.

The powder (C) is transparent in the sense of clear or opaque in the sense of hiding. Preference is given to using transparent powders (C).

The powder (C) is substantially inert. This means that, within the period of time commonly envisaged for the preparation, storage, and processing of the coating material of the invention it is soluble only sparingly if at all in the organic solvents present in the coating material of the invention, does not absorb any major constituents of the coating material or cause them to flocculate, does not enter into any chemical reactions, or enters into only very slowly proceeding chemical reactions, with essential constituents of the coating material, does not catalyze any chemical reactions between the essential constituents of the coating material, and is unaltered, or altered only very slowly, in its properties by heat and/or actinic light.

The powder (C) has an average particle size of from 1.0 to 10.0, preferably from 3.0 to 7.5, and in particular from 4.0 to 7.0 μm.

Advantageous powders (C) have a comparatively narrow particle size distribution. In other words, the fractions both of fine material and of coarse material are comparatively low. Particularly advantageous powders (C) have a maximum particle size of below 12, preferably below 11 and in particular below 10 μm.

The particles of the powder (C) for use in accordance with the invention have a density of from 1.25 to 3.6, preferably from 1.3 to 3.4, more preferably from 1.35 to 3.2, and in particular from 1.4 to 3.0 g cm$^{-3}$.

In certain cases it also possible to use particles having a higher density; in that case, however, the risk exists of the particles settling fairly rapidly on prolonged storage.

The particles of the powders (C) for use in accordance with the invention may be of any desired shape. In accordance with the invention it is of advantage if they have a spherical shape. In the context of the present invention, a spherical shape is a shape substantially like that of a ball. Examples of spherical shapes are beads, egg-shaped particles, dodecahedra or icosahedra, which may also have certain irregularities.

Examples of suitable substances of which the particles or powders (C) may consist are crosslinked or uncrosslinked organometallic polymers, inorganic minerals, salts or ceramic materials, or organically modified ceramic materials, or mixtures of these substances. Of these, the inorganic minerals are of advantage and are therefore used with preference. These minerals may be natural minerals or synthetic minerals.

Examples of the highly suitable minerals are silicon dioxide, aluminum silicates, calcium silicates, magnesium silicates, calcium aluminum silicates, magnesium aluminum silicates, calcium magnesium silicates, calcium magnesium aluminum silicates, beryllium aluminum silicates, aluminum phosphate or calcium phosphate, or mixtures thereof. Of these, silicon dioxide is particularly advantageous and is therefore used with particular preference in accordance with the invention.

The preparation of the powders (C) for use in accordance with the invention has no special features in terms of its method but instead takes place with the aid of methods such as customary and known in the field of organometallic or inorganic chemistry. For example, organometallic polymer particles may be produced by size reduction, preferably by grinding or spraying, of melts or solutions of ready-produced organometallic polymers. The inorganic particles may be produced, for example, by precipitation processes and/or size reduction. In the case of ceramic materials, it is normal first to produce a green body, which may already have the desired powder form, and then to fire it.

Where appropriate, the surfaces of the particles are subjected to an aftertreatment, for example, to a hydrophilicizing or hydrophobicizing treatment. However, the aftertreatment must not remove the inertness of the particles.

The powders (C) may be incorporated as they are into the coating materials of the invention, provided they are readily dispersed and do not agglomerate. In accordance with the invention it is of advantage if the powders (C) are incorporated in the form of powder pastes. Further advantages result if the paste resins or grinding resins used comprise binders which are present in the coating material of the invention.

The amount of the powders (C) in the coating materials of the invention may vary very widely and is guided primarily by the intensity of the light/dark shading that is to be avoided and by the specified shade of the color and effect coating which is produced from the respective coating material of the invention. It is preferred to employ from 0.05 to 7.0%, more preferably from 0.075 to 5.0%, and in particular from 0.1 to 3.5% by weight, based in each case on the solids of the coating material of the invention.

The further essential constituent of the coating material of the invention is at least one binder (A).

Examples of suitable binders (A) are random, alternating and/or block, linear and/or branched and/or comb addition (co)polymers of ethylenically unsaturated monomers, or polyaddition resins and/or polycondensation resins. Regarding these terms, refer for further details to Römpp, op. cit., page 457, "polyaddition" and "polyaddition resins (polyadducts)", and also pages 463 and 464, "polycondensates", "polycondensation" and "polycondensation resins", and also pages 73 and 74, "binders".

Examples of suitable addition (co)polymers (A) are (meth)acrylate (co)polymers or partially saponified polyvinyl esters, in particular (meth)acrylate copolymers.

Examples of suitable polyaddition resins and/or polycondensation resins (A) are polyesters, alkyds, polyurethanes, polylactones, polycarbonates, polyethers, epoxy resin-amine adducts, polyureas, polyamides, polyimides, polyester/polyurethanes, polyether-polyurethanes or polyester-polyether-polyurethanes, especially polyesters.

Of these binders (A), the (meth)acrylate (co)polymers and the polyesters, especially the polyesters, have particular advantages and are therefore used with particular preference.

The self-crosslinking binders (A) of the thermally curable and dual-cure coating materials of the invention contain reactive functional groups which are able to enter into crosslinking reactions with groups of their kind or with complementary reactive functional groups. The externally crosslinking binders (A) contain reactive functional groups which are able to enter into crosslinking reactions with complementary reactive functional groups which are present in crosslinking agents (E). Examples of suitable complementary reactive functional groups for use in accordance with the invention are compiled in the following overview. In the overview, the variable R stands for an acyclic or cyclic aliphatic radical, an aromatic radical and/or an aromatic-aliphatic (araliphatic) radical; the variables R' and R" stand for identical or different aliphatic radicals or are linked with one another to form an aliphatic or heteroaliphatic ring.

Overview: Examples of complementary functional groups

| Binder | and or | crosslinking agent |
| Crosslinking agent | and | binder |
| --- | --- | --- |
| —SH | | —C(O)—OH |
| —NH$_2$ | | —C(O)—O—C(O)— |
| —OH | | —NCO |
| —O—(CO)—NH—(CO)—NH$_2$ | | —NH—C(O)—OR |
| —O—(CO)—NH$_2$ | | —CH$_2$—OH |
| >NH | | —CH$_2$—O—R |
| | | —NH—CH$_2$—O—R |
| | | —NH—CH$_2$—OH |
| | | —N(—CH$_2$—O—R)$_2$ |
| | | —NH—C(O)—CH(—C(O)OR$_2$ |
| | | —NH—C(O)—CH(—C(O)OR) (—C(O)—R) |
| | | —NH—C(O)—N//R'R" |
| | | >Si(OR)$_2$ |
| | | 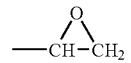 |
| | | 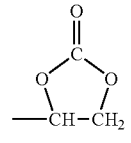 |
| —C(O)—OH | | 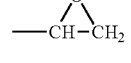 |
| | | —C(O)—N(CH$_2$—CH$_2$—OH)$_2$ |

The selection of the respective complementary groups is guided on the one hand by the consideration that they must not enter into any unwanted reactions, in particular no premature crosslinking, during the preparation, storage and application of the coating materials of the invention, and/or, if appropriate, must not disrupt or inhibit the curing with actinic radiation, and on the other by the temperature range within which crosslinking is to take place.

In the case of the coating materials for use in accordance with the invention, it is preferred to employ crosslinking temperatures of from 60 to 180° C. Therefore it is preferred to employ thio, hydroxyl, N-methylolamino, N-alkoxymethylamino, imino, carbamate, allophanate, and/or carboxyl groups, preferably hydroxyl or carboxyl groups, on the one hand and, preferably, crosslinking agents containing anhydride, carboxyl, epoxy, blocked isocyanate, urethane, methylol, methylol ether, siloxane, carbonate, amino, hydroxyl and/or beta-hydroxyalkylamide groups, preferably epoxy, beta-hydroxyalkylamide, blocked and unblocked isocyanate, urethane or alkoxymethylamino groups, on the other.

In the case of self-crosslinking coating materials of the invention, the binders contain in particular methylol, methylol ether and/or N-alkoxymethylamino groups.

Complementary reactive functional groups which are especially suitable for use in the coating materials of the invention are hydroxyl groups on the one hand and blocked and unblocked isocyanate, urethane or alkoxy-methylamino groups on the other.

The functionality of the binders (A) in respect of the above-described reactive functional groups may vary very widely and is guided in particular by the target crosslinking density and/or by the functionality of the particular crosslinking agent (E) employed. In the case of hydroxyl-containing binders (A), for example, the OH number is preferably from 15 to 300, more preferably from 20 to 250, with particular preference from 25 to 200, with very particular preference from 30 to 150, and in particular from 35 to 120, mg KOH/g.

The complementary functional groups described above may be incorporated into the binders (A) by the customary and known methods of polymer chemistry. This can be done, for example, by incorporating monomers which carry the corresponding reactive functional groups, and/or by means of polymer-analogous reactions.

Examples of suitable olefinically unsaturated monomers containing reactive functional groups are a1) monomers which carry per molecule at least one hydroxyl, amino, alkoxymethylamino, carbamate, allophanate or imino group, such as hydroxyalkyl esters of acrylic acid, methacrylic acid or another alpha,beta-olefinically unsaturated carboxylic acid which are derived from an alkylene glycol which is esterified with the acid, or which are obtainable by reacting the alpha,beta-olefinically unsaturated carboxylic acid with an alkylene oxide such as ethylene oxide or propylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indenedimethanol or methyl-propanediol monoacrylate, monomethacrylate, monoethacrylate, monocrotonate, monomaleate, monofumarate or monoitaconate; reaction products of cyclic esters, such as epsilon-caprolactone, for example, and these hydroxyalkyl or hydroxycycloalkyl esters;

olefinically unsaturated alcohols such as allyl alcohol;

polyols such as trimethylolpropane monoallyl or diallyl ether or pentaerythritol monoallyl, diallyl or triallyl ether;

reaction products of acrylic acid and/or methacrylic acid with the glycidyl ester of an alpha-branched monocarboxylic acid having 5 to 18 carbon atoms per molecule, especially a Versatic® acid, or, instead of the reaction product, an equivalent amount of acrylic acid and/or methacrylic acid which subsequently, during or after the polymerization reaction, is reacted with the glycidyl ester of an alpha-branched monocarboxylic acid having 5 to 18 carbon atoms per molecule, especially a Versatic® acid;

aminoethyl acrylate, aminoethyl methacrylate, allylamine or N-methyliminoethyl acrylate;

N,N-di(methoxymethyl)aminoethyl acrylate or methacrylate or N,N-di(butoxymethyl)aminopropyl acrylate or methacrylate;

(meth)acrylamides such as (meth)acrylamide, N-methyl-, N-methylol-, N,N-dimethylol-, N-methoxymethyl-, N,N-di(methoxymethyl)-, N-ethoxymethyl- and/or N,N-di(ethoxyethyl)-(meth)acrylamide;

acryloyloxy- or methacryloyloxyethyl, -propyl or -butyl carbamate or allophanate; further examples of suitable monomers containing carbamate groups are described in the patents U.S. Pat. No. 3,479,328, U.S. Pat. No. 3,674,838, U.S. Pat. No. 4,126,747, U.S. Pat. No. 4,279,833 or U.S. Pat. No. 4,340,497;

a2) monomers which carry per molecule at least one acid group, such as acrylic acid, beta-carboxyethyl acrylate, methacrylic acid, ethacrylic acid, crotonic acid, maleic acid, fumaric acid or itaconic acid;

olefinically unsaturated sulfonic or phosphonic acids or their partial esters;

mono(meth)acryloyloxyethyl maleate, succinate or phthalate; or vinylbenzoic acid (all isomers), alpha-methylvinylbenzoic acid (all isomers) or vinylbenzenesulfonic acid (all isomers);

a3) monomers containing epoxy groups, such as the glycidyl ester of acrylic acid, methacrylic acid, ethacrylic acid, crotonic acid, maleic acid, fumaric acid or itaconic acid, or allyl glycidyl ether.

Monomers of the type described above that are of relatively high functionality are generally used in minor amounts. In the context of the present invention, minor amounts of monomers of relatively high functionality are those amounts which do not lead to crosslinking or gelling of the copolymers (A), especially the (meth)acrylate copolymers (A), unless the specific intention is to prepare crosslinked polymeric microparticles.

Examples of suitable monomer units for introducing reactive functional groups into polyesters (A) are 2,2-dimethylolethyl- or -propylamine blocked with a ketone, the resulting ketoxime group being hydrolyzed again after the incorporation; or compounds containing two hydroxyl groups or two primary and/or secondary amino groups and also at least one acid group, in particular at least one carboxyl group and/or at least one sulfonic acid group, such as dihydroxypropionic acid, dihydroxysuccinic acid, dihydroxybenzoic acid, 2,2-dimethylolacetic acid, 2,2-dimethylolpropionic acid, 2,2-dimethylolbutyric acid, 2,2-dimethylol-pentanoic acid, alpha,omega-diaminovaleric acid, 3,4-diaminobenzoic acid, 2,4-diaminotoluenesulfonic acid or 2,4-diaminodiphenyl ether sulfonic acid.

One example of introducing reactive functional groups by way of polymer-analogous reactions is the reaction of hydroxyl-containing resins with phosgene, resulting in resins containing chloroformate groups, and the polymer-analogous reaction of the chloroformate-functional resins with ammonia and/or primary and/or secondary amines to give resins containing carbamate groups. Further examples of suitable methods of this kind are known from the patents U.S. Pat. Nos. 4,758,632 A1, 4,301,257 A1 or 2,979,514 A1.

The binders (A) of the dual-cure coating materials of the invention further contain on average per molecule at least one, preferably at least two, group(s) containing at least one bond which can be activated with actinic radiation.

In the context of the present invention, a bond which can be activated with actinic radiation is a bond which on exposure to actinic radiation becomes reactive and, with other activated bonds of its kind, enters into polymerization reactions and/or crosslinking reactions which proceed in accordance with free-radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds. Of these, the carbon-carbon double bonds are particularly advantageous and are therefore used with very particular preference in accordance with the invention. For the sake of brevity, they are referred to below as "double bonds".

Accordingly, the group which is preferred in accordance with the invention contains one double bond or two, three or four double bonds. If more than one double bond is used, the double bonds may be conjugated. In accordance with the invention, however, it is of advantage if the double bonds are present in isolation, in particular each being present terminally, in the group in question. It is of particular advantage in accordance with the invention to use two double bonds, or especially one double bond.

The dual-cure binder (A) contains on average at least one of the above-described groups which can be activated with actinic radiation. This means that the functionality of the binder (A) in this respect is integral, i.e., is for example two, three, four, five or more, or is nonintegral, i.e., is for example from 2.1 to 10.5 or more. The decision as to which functionality is chosen is guided by the requirements imposed on the particular dual-cure coating material of the invention.

If on average per molecule more than one group which can be activated with actinic radiation is employed, the groups are structurally different from one another or are of the same structure.

If they are structurally different from one another, this means in the context of the present invention that use is made of two, three, four or more, but especially two, groups which can be activated with actinic radiation, which are derived from two, three, four or more, but especially two, monomer classes.

Examples of suitable groups are (meth)acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl ether, norbornenyl ether, isoprenyl ether, isopropenyl ether, allyl ether or butenyl ether groups; or dicyclopentadienyl ester, norbornenyl ester, isoprenyl ester, isopropenyl ester, allyl ester or butenyl ester groups, but especially acrylate groups.

Preferably, the groups are attached to the respective parent structures of the binders (A) via urethane, urea, allophanate, ester, ether and/or amide groups, but in particular via ester groups. Normally, this occurs as a result of customary and known polymer-analogous reactions such as, for instance, the reaction of lateral glycidyl groups with the olefinically unsaturated monomers described above that contain an acid group, of lateral hydroxyl groups with the halides of these monomers, of hydroxyl groups with isocyanates containing double bonds such as vinyl isocyanate, methacryloyl isocyanate and/or 1-(1-isocyanato-1-methylethyl)-3-(1-methylethenyl)benzene (TMI® from CYTEC), or of isocyanate groups with the hydroxyl-containing monomers described above.

However, in the dual-cure coating materials of the invention it is also possible to employ mixtures of binders (A) that are curable by means of heat alone and binders (A) that are curable with actinic radiation alone.

The material composition of the binders (A) does not basically have any special features; rather, suitable binders (A) include all of the binders intended for use in powder clearcoat slurries curable thermally and/or with actinic radiation that are described in the U.S. Pat. No. 4,268,542 A1 or U.S. Pat. No. 5,379,947 A1 and in the patent applications DE 27 10 421 A1, DE 195 40 977 A1, DE 195 18 392 A1, DE 196 17 086 A1, DE 196 13 547 A1, DE 196 18 657 A1, DE 196 52 813 A1, DE 196 17 086 A1, DE 198 14 471 A1, DE 198 41 842 A1, DE 198 41 408 A1, DE 199 08 018 A1 or DE 199 08 013 A1 or in the European patent EP 0 652 264 A1, all of the binders intended for use in thermally curable clearcoat materials that are described in the German patent application DE 42 04 518 A1, all of the binders that are intended for use in dual-cure clearcoat materials and are described in the patent applications DE 198 18 735 A1, DE 198 35 296 A1, DE 197 36 083 A1, and DE 198 41 842 A1, or all of the binders intended for use in thermally curable powder clearcoat materials that are described in the German patent application DE 42 22 194 A1, in the BASF Lacke+Farben AG product information literature "Pulverlacke", 1990, or in the BASF Coatings AG company brochure "Pulverlacke, Pulverlacke für industrielle Anwendungen", January 2000.

Suitable additional binders for the dual-cure coating materials of the invention are the binders intended for use in UV-curable clearcoat materials and powder clearcoat materials that are described in the European patent applications EP 0 928 800 A1, EP 0 636 669 A1, EP 0 410 242 A1, EP 0 783 534 A1 EP 0 650 978 A1, EP 0 650 979 A1, EP 0 650 985 A1, EP 0 540 884 A1, EP 0 568 967 A1, EP 0 054 505 A1 or EP 0 002 866 A1, in the German patent applications DE 197 09 467 A1, DE 42 03 278 A1, DE 33 16 593 A1, DE 38 36 370 A1, DE 24 36 186 A1, and DE 20 03 579 B1, in the international patent applications WO 97/46549 or WO 99/14254, or in the American patents U.S. Pat. No. 5,824, 373 A1, 4,675,234 A1, 4,634,602 A1, 4,424,252 A1, 4,208, 313 A1, 4,163,810 A1, 4,129,488 A1, 4,064,161 A1, and 3,974,303 A1.

The preparation of the binders (A) also has no special features in terms of its method but instead takes place with the aid of the customary and known methods of polymer chemistry, as are described, for example, in detail in the patent documents listed above.

Further examples of suitable preparation processes for (meth)acrylate copolymers (A) are described in the European patent application EP 0 767 185 A1, in the German patents DE 22 14 650 B1 or DE 27 49 576 B1, and in the American patents U.S. Pat. Nos. 4,091,048 A1, 3,781,379 A1, 5,480,493 A1, 5,475,073 A1, and 5,534,598 A1, or in the standard work Houben-Weyl, Methoden der organischen Chemie, 4th edition, volume 14/1, pages 24 to 255, 1961. Suitable reactors for the copolymerization include the customary and known stirred tanks, stirred tank cascades, tube reactors, loop reactors or Taylor reactors, as described for example in the patents and patent applications DE 1 071 241 B1, EP 0 498 583 A1, and DE 198 28 742 A1, or in the article by K. Kataoka in Chemical Engineering Science, volume 50, No. 9, 1995, pages 1409 to 1416.

The preparation of polyesters (A) is described, for example, in the standard work Ullmanns Encyklopädie der technischen Chemie, 3rd edition, volume 14, Urban & Schwarzenberg, Munich, Berlin, 1963, pages 80 to 89 and pages 99 to 105, and in the following books: "Résines Alkydes-Polyesters" by J. Bourry, Dunod, Paris, 1952, "Alkyd Resins" by C. R. Martens, Reinhold Publishing Corporation, New York, 1961, and "Alkyd Resin Technology" by T. C. Patton, Interscience Publishers, 1962, or in the German patent application DE 42 04 518 A1.

The fraction of the binders (A) for use in accordance with the invention in the coating materials of the invention may likewise vary extremely widely and is guided primarily by the intended use of the coating materials. Where the coating materials of the invention are curable thermally or both thermally and with actinic radiation, the amount is guided in particular by the functionality of the binders (A) in respect of the crosslinking reaction with the crosslinking agent (E). It is preferred to use from 10 to 80%, with particular preference from 15 to 70%, and in particular from 20 to 60% by weight, based in each case on the solids content of the coating material of the invention.

The third essential constituent of the coating material of the invention is at least one color and/or effect pigment (B), in particular an effect pigment (B).

Examples of suitable effect pigments are metal flake pigments such as commercially customary aluminum bronzes, aluminum bronzes chromated in accordance with DE 36 36 183 A1, and commercially customary stainless steel bronzes, and also nonmetallic effect pigments, such as pearlescent pigments and interference pigments, platelet-shaped effect pigments based on iron oxide with a shade from pink to brownish red, or liquid-crystalline effect pigments. For further details, refer to Römpp, op. cit., page 176, "effect pigments" and pages 380 and 381, "metal oxide-mica pigments" to "metal pigments" and to the patent applications and patents DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. No. 4,828,826 A, and U.S. Pat. No. 5,244,649 A.

Examples of suitable inorganic color pigments are white pigments such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate.

Examples of suitable organic color pigments are monoazo pigments, disazo pigments, anthraquinone pigments; benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details, refer to Römpp, op. cit., pages 180 and 181, "iron blue pigments" to "black iron oxide", pages 451 to 453, "pigments" to "pigment volume concentration", page 563, "thioindigo pigments", page 567, "titanium dioxide pigments", pages 400 and 467, "naturally occurring pigments", page 459, "polycyclic pigments", page 52 "azomethine pigments", "azo pigments", and page 379, "metal complex pigments".

The pigments (B) may be incorporated as they are into the coating material of the invention, provided they are readily dispersed and do not agglomerate and/or their form that is responsible for the optical effects is not damaged or destroyed. In accordance with the invention it is of advantage if the pigments (B) are incorporated in the form of pigment pastes. Further advantages result if the paste resins or grinding resins used comprise binders (A) which are present in the coating material of the invention (cf. also Römpp, op. cit., "pigment preparations", page 452).

The fraction of the pigments (B) in the coating material of the invention may vary extremely widely and is guided primarily by the hiding power of the pigments, by the desired shade and by the desired optical effect. The pigments (B) are preferably present in the coating material of the invention in an amount of from 0.1 to 50%, more preferably from 0.5 to 45%, with particular preference from 0.5 to 40%, with very particular preference from 0.5 to 35%, and in particular from 0.5 to 30% by weight, based in each case on the solids content of the coating material of the invention.

Furthermore, the coating materials of the invention may comprise fluorescent, electrically conductive and/or magnetically shielding pigments, metal powders, organic, transparent or opaque fillers and/or nanoparticles (D).

Examples of fluorescent pigments (daylight-fluorescent pigments) are bis(azomethine) pigments.

Examples of suitable electrically conductive pigments are titanium dioxide/tin oxide pigments.

Examples of magnetically shielding pigments are pigments based on iron oxides or chromium dioxide.

Examples of suitable metal powders are powders of metals and metal alloys, such as aluminum, zinc, copper, bronze or brass.

Examples of organic fillers are polymer powders, especially those of polyamide or polyacrylonitrile.

Suitable nanoparticles are selected from the group consisting of hydrophilic and hydrophobic, especially hydrophilic, nanoparticles based on silicon dioxide, aluminum oxide, zinc oxide and zirconium oxide and the polyacids and heteropolyacids of transition metals, preferably of molybdenum and tungsten, having a primary particle size <50 nm, preferably from 5 to 50 nm, in particular from 10 to 30 nm. The hydrophilic nanoparticles preferably have no matting effect. Particular preference is given to using nanoparticles based on silicon dioxide.

Very particular preference is given to using hydrophilic pyrogenic silicas whose agglomerates and aggregates have a chainlike structure and which are preparable by the flame hydrolysis of silicon tetrachloride in an oxyhydrogen flame. They are sold, for example, by Degussa under the brand name Aerosil®. Very particular preference is also given to using precipitated waterglasses, such as nanohectorites, which are sold, for example, by Südchemie under the brand name Optigel® or by Laporte under the brand name Laponite®.

Further suitable nanoparticles are described in the American patent U.S. Pat. No. 4,652,470 A, column 7 line 49 to column 13 line 36.

The externally crosslinking coating materials of the invention which are curable thermally, or curable thermally and with actinic radiation, comprise at least one crosslinking agent (E) which contains at least one of the above-described complementary reactive functional groups.

Suitable crosslinking agents (E) are known from the German patent application DE 199 24 171 A1, page 7 line 38 to page 8 line 47.

The coating material of the invention further comprises at least one organic solvent (F). The solvents in question may be low-boiling and high-boiling ("long") organic solvents (F). The organic solvents (F) are preferably inert, i.e., they do not enter into any reactions with the other constituents of the coating material of the invention, unless they are the below-listed reactive diluents (G) curable thermally or with actinic radiation. The organic solvents are preferably selected from the solvents described in D. Stoye and W. Freitag (editors), "Paints, Coatings and Solvents", second, completely revised edition, Wiley-VCH, Weinheim, New York, 1998, "14.9 Solvent Groups", pages 327 to 373.

The coating material of the invention may further comprise at least one typical coatings additive (G).

Examples of suitable additives (G) are molecularly dispersely soluble dyes; light stabilizers, such as UV absorbers and reversible free-radical scavengers (HALS); antioxidants; devolatilizers; wetting agents; emulsifiers; slip additives; polymerization inhibitors; thermal crosslinking catalysts; thermolabile free-radical initiators; photoinitiators and photocoinitiators; thermally curable reactive diluents; reactive diluents curable with actinic radiation; binders curable with actinic radiation; adhesion promoters; leveling agents; film formation auxiliaries; rheological aids (thickeners and/or sag control agents); flame retardants; corrosion inhibitors; free-flow aids; waxes; siccatives; biocides and/or flatting agents; such as are described in detail, for example, in the textbook "Lackadditive" [Additives for Coatings] by Johan Bieleman, Wiley-VCH, Weinheim, New York, 1998, and in the German patent application DE 199 14 896 A1, column 14 line 26 to column 15 line 46. For further details, refer to DE 199 04 317 A1 and DE 198 55 125 A1.

The coating material of the invention, especially the basecoat material of the invention, is outstandingly suitable for the production of multicoat color and/or effect paint systems on primed and unprimed substrates by the wet-on-wet technique. Furthermore, the coating material of the invention, especially the solid-color topcoat material of the invention, is outstandingly suitable for the production of single-coat color and/or effect paint systems.

Otherwise, the coating material of the invention may also be used as an adhesive or sealing compound or as a starting product for the preparation of self-supporting paint films.

Particular advantages are displayed by the coating material of the invention in its use as a basecoat material in the context of the wet-on-wet technique, in which the basecoat material is applied to the primed or unprimed substrate and flashed off and/or dried, but not cured, and then the basecoat film is overcoated with a clearcoat material and the resultant clearcoat film is cured together with the aqueous basecoat film, thermally or both thermally and with actinic radiation (dual cure).

Suitable coating substrates are all surfaces which are not damaged by curing of the films present thereon using heat or using a combination of heat and actinic radiation (dual cure); examples include metals, plastics, wood, ceramic, stone, textile, fiber composites, leather, glass, glass fibers, glass-wool and rockwool, mineral- and resin-bound building materials, such as plasterboard panels and cement slabs or roof tiles, and also composites of these materials.

In the case of electrically conductive substrates it is possible to use primers which are produced in a customary and known manner from electrodeposition coating materials (electrocoat materials). Both anodic and cathodic electrocoat materials are suitable for this purpose, but especially cathodic. Usually, and especially in automotive finishing, the electrocoat is overcoated with a primer-surfacer coat or antistonechip primer coat, which may be regarded as part of the primer system.

It is also possible to coat, bond or seal primed or unprimed plastics parts made, for example, of ABS, AMMA, ASA, CA, CAB, EP, UF, CF, MF, MPF, PF, PAN, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM and UP (abbreviated codes in accordance with DIN 7728T1). Unfunctionalized and/or nonpolar substrate surfaces may be subjected prior to coating in a known manner to a pretreatment, such as with a plasma or by flaming, or may provided with a water-based primer.

Accordingly, the coating materials of the invention are outstandingly suitable for the coating of motor vehicle bodies, parts of motor vehicle bodies, the interior and exterior of motor vehicles, buildings inside and out, doors, windows and furniture, and for coating in the context of industrial coating of, for example, small parts, such as nuts, bolts, wheel rims or hubcaps, coils, containers, packaging, electrical components, such as motor windings or transformer windings, and white goods, such as domestic appliances, boilers and radiators.

In the context of automotive finishing, the coating materials of the invention are of outstanding suitability for the production of original finishes (OEM) and refinishes.

The coating materials of the invention may be applied by any of the customary application methods, such as spraying, knife coating, brushing, flow coating, dipping, impregnating, trickling or rolling, for example. The substrate to be coated may itself be at rest, with the application device or unit being moved. Alternatively, the substrate to be coated, particularly a coil, may be moved, with the application unit being at rest relative to the substrate or being moved appropriately.

It is preferred to employ spray application methods, such as compressed air spraying, airless spraying, high-speed rotation, electrostatic spray application (ESTA), alone or in conjunction with hotspray application such as hot air spraying, for example. Application may be made at temperatures of max. 70 to 80° C., so that suitable application viscosities are achieved without any change in or damage to the basecoat material and its overspray (which may be intended for reprocessing) during the short period of thermal loading. For instance, hotspraying may be configured in such a way that the basecoat material is heated only very shortly in the spray nozzle or shortly before the spray nozzle.

It is particularly advantageous to apply the basecoat material of the invention by ESTA in a first application and to apply a second application pneumatically.

Where the basecoat materials of the invention include constituents which can be activated with actinic radiation, application is preferably carried out in the absence of light. These application methods may of course be used for the application of the clearcoat as well in the context of the wet-on-wet technique of the invention.

Curing may take place after a certain rest period. This period may have a duration of from 30 s to 2 h, preferably from 1 min to 1 h, and in particular from 1 min to 45 min. The rest period is used for example, for leveling and devolatilization of the paint films or for the evaporation of volatile constituents such as solvents. The rest period may be assisted and/or shortened by the use of elevated temperatures up to 90° C. and/or by a reduced air humidity <10 g water/kg air, especially <5 g/kg air, provided this does not entail any damage to or change in the paint films, such as premature complete crosslinking, for instance.

Physical curing takes place during the rest period and may be accelerated by the application of heat, it being possible to employ the methods used below in the context of the thermal cure.

The thermal cure has no special features as far as this method is concerned, but is instead carried out in accordance with the customary and known methods such as heating in a forced air oven or exposure to IR lamps. The thermal cure may also take place in stages. The thermal cure takes place advantageously at a temperature of from 50 to 100° C., with particular preference from 60 to 100° C., and in particular from 80 to 100° C., for a period of from 1 min up to 2 h, with particular preference from 2 min up to 1 h, and in particular from 3 min to 45 min. Where substrates are used which have high thermal load-bearing capacities, the thermal crosslinking may also be carried out at temperatures above 100° C. In this case it is generally advisable not to exceed temperatures of 180° C., preferably 160° C., and in particular 155° C.

The actinic radiation cure also has no special features as far as this method is concerned, but instead takes place in a customary and known manner by irradiation with UV lamps and/or electron beam sources, preferably under inert gas, as is described, for example, in the German patent application DE 198 18 735 A1, column 10 lines 31 to 61.

In the case of conjoint curing of the dual-cure basecoat films of the invention with the clearcoat films, the thermal cure and actinic radiation cure may be employed simultaneously or alternately. Where the two curing methods are used alternately, it is possible, for example, to commence with the thermal cure and to end with the actinic radiation cure. In other cases it may prove advantageous to begin and to end with the actinic radiation cure. The skilled worker is able to determine the curing method most advantageous for the case in hand on the basis of his or her general knowledge in the art, possibly with the assistance of simple preliminary tests. For further details, refer to the German patent application DE 198 18 735 A1, column 10 line 31 to column 11 line 33.

In this context it is found to be a further particular advantage of the basecoat material of the invention that all of the customary and known clearcoat materials may be combined with the basecoat film of the invention in the context of the wet-on-wet technique.

Clearcoat materials known per se are one-component or multicomponent clearcoat materials, powder clearcoat materials, powder slurry clearcoat materials, UV-curable clearcoat materials or sealers, as are known from the patent applications, patents and publications DE 42 04 518 A1, EP 0 594 068 A1, EP 0 594 071 A1, EP 0 594 142 A1, EP 0 604 992 A1, EP 0 596 460 A1, WO 94/10211, WO 94/10212, WO 94/0213, WO 94/22969 or WO 92/22615, U.S. Pat. Nos. 5,474,811 A1, 5,356,669 A1 or 5,605,965 A1, DE 42 22 194 A1, the BASF Lacke+Farben AG product information literature "Pulverlacke", 1990, the BASF Coatings AG brochure "Pulverlacke, Pulverlacke für industrielle Anwendungen", January 2000, U.S. Pat. No. 4,268,542 A1, DE 195 40 977 A1, DE 195 18 392 A1, DE 196 17 086 A1, DE-A-196 13 547, DE 196 52 813 A1, DE-A-198 14 471 A1, EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1, EP 0 002 866 A1, DE 197 09 467 A1, DE 42 03 278 A1, DE 33 16 593 A1, DE 38 36 370 A1, DE 24 36 186 A1, DE 20 03 579 B1, WO 97/46549, WO 99/14254, U.S. Pat. No. 5,824, 373 A1, 4,675,234 A1, 4,634,602 A1, 4,424,252 A1, 4,208, 313 A1, 4,163,810 A1, 4,129,488 A1, 4,064,161 A1, 3,974, 303 A1, EP 0 844 286 A1, DE 43 03 570 A1, DE 34 07 087 A1, DE 40 11 045 A1, DE 40 25 215 A1, DE 38 28 098 A1, DE 40 20 316 A1 and DE 41 22 743 A1.

Within the multicoat paint system of the invention the thickness of the individual coats may vary widely. In accordance with the invention it is of advantage, however, if the basecoat has a thickness of from 5 to 25 μm, in particular from 7 to 20 μm, and the clearcoat has a thickness of from 15 to 120 μm, preferably from 30 to 80 μn and in particular from 40 to 70 μm.

The single-coat and multicoat paint systems of the invention have outstanding optical, mechanical, and chemical properties. For instance, they are free from any surface defects such as shrinkage (wrinkling). Moreover, they have a particularly high hiding power and outstanding optical effects, especially cloud-free metallic effects.

Moreover, in the course of refinishing using the coating materials of the invention, differences in shade between the original finish and the refinish, if they are present at all, are only very slight, and acceptable, if one and the same basecoat material of the invention is used.

INVENTIVE AND COMPARATIVE EXAMPLES

Preparation Example 1

The Preparation of a Silicon Dioxide Paste for Inventive use 75 parts by weight of a commercially customary, branched polyester resin suitable for basecoat materials and having a solids content of 60% by weight (solvent: Solventnaphtha®/butyl acetate 1:1) and an OH number of 80 mg KOH/g, 10 parts by weight of a silicon dioxide powder with an average particle size of 5.8 μm and a density of 2.5 g/cm$^3$ and 15 parts by weight of butyl glycol acetate were mixed with one another and homogenized.

Preparation Example 2

The Preparation of the Solution of a Film Formation Auxiliary 15 parts by weight of a cellulose ester from Eastman with an acetyl content of 16% by weight and a butyrate content of 33-38.9% by weight, based on the cellulose ester, were dissolved in 75 parts by weight of a mixture of butyl acetate and isotridecyl alcohol in a weight ratio of 23:1.

Preparation Example 3

The Preparation of a Paste of an Aluminum Effect Pigment

The paste was prepared from 33 parts by weight of an aluminum effect pigment, 33 parts by weight of a mixture comprising, based on the mixture, 37.5% by weight of a 6 percent dispersion of a modified polyethylene wax in butyl acetate/Solventnaphtha®, 12.5% by weight of butyl acetate and 50% by weight of a solution of the film formation auxiliary from preparation example 2, and 33 parts by weight of butyl acetate

Inventive Example 1

The Preparation of an Inventive Basecoat Material

The inventive basecoat material was prepared by mixing the following constituents in the stated order and homogenizing the resulting mixture:
  225 parts by weight of a 6' percent dispersion of a modified polyethylene wax in butyl acetate/Solventnaphtha®,
  183 parts by weight of the film formation auxiliary from preparation example 2,
  126 parts by weight of a commercially customary, branched polyester resin suitable for basecoat materials and having a solids content of 60% by weight (solvent: Solventnaphtha®/butyl acetate 1:1) and an OH-number of 80 mg KOH/g,
  63 parts by weight of a pseudoplastic polyester (Setal® 90173 from Akzo),
  126 parts by weight of a solution of a medium-reactivity melamin resin partially etherified with butanol (55 percent in butanol),
  24 parts by weight of an epoxidized fatty acid ester,
  14 parts by weight of butyl acetate,
  13 parts by weight of butanol,
  55 parts by weight of butyl glycol acetate,
  1.3 parts by weight of a commercial coatings additive (Byk® 410 from Byk Chemie),
  5 parts by weight of a silicone-free leveling agent based on an amino-resin-modified methacrylate copolymer,
  20 parts by weight of the silicon dioxide paste from preparation example 1,
  90 parts by weight of the paste of an aluminum effect pigment from preparation example 3, and
  75 parts by weight of butyl acetate.

The basecoat material had a viscosity of 23 seconds in the DIN4 flow cup. For application, the basecoat material was adjusted with 290 parts by weight of butyl acetate to a spray viscosity of 26 seconds in the ISO4 flow cup.

Comparative Example C1

Preparation of a Noninventive Basecoat Material

Example 1 was repeated except that the silicon dioxide paste from preparation example 1, for use in accordance with the invention, was not used. The polyester fraction and the solvent fraction introduced into the basecoat material 1 of inventive example 1 by the silicon dioxide paste was compensated in the present comparative example by the addition of polyester and solvent.

Inventive Example 2 and Comparative Example C2

The production of an Inventive (Inventive Example 2) and of a Noninventive (Comparative Example C2) Multicoat Paint System For inventive example 2, the basecoat material 1 from inventive example 1 was used.

For comparative example C2, the basecoat material C1 from comparative example C1 was used.

For the testing of the performance properties of the basecoat materials 1 and C1, test panels measuring 30×70 cm were produced in a customary and known manner. This was done by coating steel panels (bodywork panels), which had been coated with a customary and known, cathodically deposited and baked electrocoat, with a commercial primer-surfacer from BASF Coatings AG), after which the resulting primer-surfacer films were flashed off at 20° C. and a relative atmospheric humidity of 65% for 5 minutes and baked in a forced air oven at 140° C. for 30 minutes.

After the test panels were cooled to 20° C., in a first series the basecoat materials 1 and C1 were applied in a wedge pneumatically using an automated sprayer. The basecoat films were then flashed off for 5 minutes and overcoated with a commercial two-component clearcoat material (BASF Coatings AG). Thereafter the basecoat films and the clearcoat films were baked at 130° C. for 30 minutes, so giving the inventive multicoat effect system of inventive example 2 and the noninventive multicoat system of comparative example C2.

The shade stability of the multicoat systems as a function of the thickness of the basecoats was determined with the aid of the method described in the German patent application DE 197 09 406 A1 or the European patent EP 0 842 414 B1. The shade of the inventive multicoat system from inventive example 2 was found to be stable, whereas this was not the case with the noninventive multicoat system from comparative example C2.

The first series was repeated, except that the basecoat films were applied hidingly in a uniform film thickness.

The test panels were assessed visually for light-dark shading (clouds) under diffuse light from a distance of from 2 to 3 m, straight on (80°) and obliquely (40°), and were rated accordingly (rating 1: no clouds visible; to rating 5: clouds very distinctly visible).

For inventive example 2, the rating was 1 for both straight-on and oblique viewing. For comparative example C2, the ratings were 4 when viewed straight on and 5 when viewed obliquely. This underscored the fact that the inventive use of the silicon dioxide enabled a significant improvement to be achieved in the light-dark shading.

Inventive Example 3 and Comparative Example C3

The production of an Inventive (Inventive Example 3) and of a Noninventive (Comparative Example C3) Refinish System For inventive example 3, the basecoat material 1 from inventive example 1 was used.

For the comparative experiment C3, the basecoat material C1 from comparative example C1 was used.

For the testing of the performance properties of the basecoat materials 1 and C1 in automotive refinish, test panels measuring 30×70 cm were produced in a customary and known manner. This was done by coating steel panels (bodywork panels), which had been coated with a customary and known, cathodically deposited and baked electrocoat, with a commercial primer-surfacer from BASF Coatings AG), after which the resulting primer-surfacer films were flashed off at 20° C. and a relative atmospheric humidity of 65% for 5 minutes and baked in a forced air oven at 140° C. for 30 minutes.

After the test panels were cooled to 20° C., the basecoat materials 1 and C1 were applied hidingly, 60% electrostatically using an ESTA high-speed rotary bell, and 40% pneumatically. The basecoat films were then flashed off for 5 minutes and overcoated with a commercial two-component clearcoat material (BASF Coatings AG). Thereafter the basecoat films and the clearcoat films were baked at 130° C. for 30 minutes.

After the test panels had cooled to room temperature, half of their coated surfaces was covered.

In order to simulate a refinish, the uncovered halves of the test panels bearing the noninventive multicoat paint system were provided, as described above, with a further inventive multicoat paint system (inventive example 3), but the basecoat material was applied pneumatically.

In order to simulate a refinish, the uncovered halves of the test panels bearing the noninventive multicoat paint system were provided, as described above, with a further noninventive multicoat paint system (comparative example C3), and here again the basecoat material was applied pneumatically.

The difference in shade between the original finishes and the refinishes was determined by colorimetry and rated as follows:

rating 1, no deviation;

rating 2, slight deviation, still acceptable;

rating 3, moderate deviation;

rating 4, already clearly visible deviation; and rating 5, severe deviation.

The inventive refinish of inventive example 3 received the rating 2; the noninventive refinish of comparative example C3 received the rating 5.

What is claimed is:

1. A solventborne coating material that that has an optical effect from an effect pigment and is resistant to clouding, the solventborne coating material comprising
    A) at least one binder curable by one of i) physically, ii) thermally, or iii) thermally and with actinic radiation,
    B) at least one effect pigment or a mixture of a color pigment and an effect pigment, and
    C) at least one transparent or colorless powder present in an amount of from 0.05 to 7.0% by weight, based on the solids content of the coating material, the powder C) being substantially inert with respect to the other constituents of the coating material and whose particles have average size of from 3.0 to 7.5 µm, a particle size distribution such that the maximum particle size is below 10 µm, and a density of from 1.25 to 3.6 g cm$^{-3}$,
    wherein the solventborne coating material is curable by one of i) physically, ii) thermally, or iii) thermally and with actinic radiation, and components A), B) and C) are present in a combination such that an optical effect coating prepared from the solventborne coating material does not exhibit clouding.

2. The solventborne coating material of claim 1, wherein the particles have an average particle size of from 4.0 to 7.0 µm.

3. The solventborne coating material of claim 1, wherein the particles have a density of from 1.4 to 3.0 g cm$^{-3}$.

4. The solventborne coating material of claim 1, wherein the particles have a spherical shape.

5. The solventborne coating material of claim 1, wherein the particles are selected from the group consisting of crosslinked organic polymers, crosslinked organometallic polymers, uncrosslinked organic polymers, uncrosslinked organometallic polymers, inorganic minerals, salts, ceramic materials, organically modified ceramic materials, and mixtures thereof.

6. The solventborne coating material of claim 1, wherein the particles are selected from the group consisting of silicon dioxide, aluminum silicates, calcium silicates, magnesium silicates, calcium aluminum silicates, magnesium aluminum silicates, calcium magnesium silicates, calcium magnesium aluminum silicates, beryllium aluminum silicates, aluminum phosphate, calcium phosphate, and mixtures thereof.

7. The solventborne coating material of claim 1, wherein the particles have a spherical shape and are selected from the group consisting of silicon dioxide, aluminum silicates, calcium silicates, magnesium silicates, calcium aluminum silicates, magnesium aluminum silicates, calcium magnesium silicates, calcium magnesium aluminum silicates, beryllium aluminum silicates, aluminum phosphate, calcium phosphate, and mixtures thereof.

8. A method comprising applying to solventborne costing material claim 1 to a substrate and forming one of an automotive OEM finish, an automotive refinish, an industrial coating, a coil coating, a container coating, a plastics coating, or a furniture coating and which does not exhibit clouding.

9. The method of claim 8, wherein the solventborne coating material is applied as a basecoat for an automotive OEM finish or an automotive refinish.

10. A process for producing an effect paint system comprising applying the solventborne coating material of claim 1 to a substrate and forming at least one film, and curing the at least one film by one of i) thermal curing or ii) curing with heat and actinic light, wherein the cured film does pot exhibit clouding.

11. A process comprising
    (I) applying the solventborne coating material of claim 1 to a substrate to form a basecoat film,
    (II) flashing off and/or initially drying the resulting basecoat film,
    (III) applying a clearcoat film to the basecoat film, and
    (V) curing the basecoat film and the clearcoat film to one of i) thermal curing or ii) to thermal curing and curing with actinic radiation,
    wherein the cured film does not exhibit clouding.

* * * * *